United States Patent
Guleryuz (10) Patent No.: US 7,525,702 B2
(45) Date of Patent: Apr. 28, 2009

(54) METHODS AND SYSTEMS FOR CORRECTING COLOR DISTORTIONS

(75) Inventor: Onur G. Guleryuz, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 904 days.

(21) Appl. No.: 10/909,454

(22) Filed: Aug. 2, 2004

(65) Prior Publication Data

US 2006/0023942 A1   Feb. 2, 2006

(51) Int. Cl.
*G03F 3/08* (2006.01)
*G06K 9/00* (2006.01)

(52) U.S. Cl. .................. 358/518; 382/167; 382/275; 382/300

(58) Field of Classification Search ............. 382/367, 382/167, 162, 274, 275, 300; 358/518, 525
See application file for complete search history.

(56) References Cited

U.S. PATENT DOCUMENTS

| 6,175,428 | B1 | 1/2001 | On et al. |
| 6,577,408 | B1 | 6/2003 | Rusnack et al. |
| 6,687,414 | B1 | 2/2004 | Edgar |
| 2001/0030697 | A1 | 10/2001 | Dischert et al. |
| 2003/0174353 | A1 | 9/2003 | Rusnack et al. |
| 2004/0130613 | A1* | 7/2004 | To et al. .................. 347/245 |

FOREIGN PATENT DOCUMENTS

| CN | 1205593 A | 1/1999 |
| CN | 1225129 C | 10/2005 |
| JP | 2001-203900 | 7/2001 |
| JP | 2003-143421 | 5/2003 |

* cited by examiner

*Primary Examiner*—Duy M Dang (57) ABSTRACT

A color distortion correction is obtained by calculating a color shift of a first color channel with respect to a second color channel along each pixel column of a scanned calibration image. The color shift defines a correction for the color distortions and the correction is then applied to subsequent scanned images. A system for correcting color distortions and an image processing chip configured to determine the color shift are also described.

12 Claims, 9 Drawing Sheets

| | | | | | |
|---|---|---|---|---|---|
| Shift Increments | 0.01 | 0.02 | 0.03 | 0.04 | 0.05 |
| ROW 1 Differences | 50 | 40 | 25 | 0 | 30 |
| ROW 2 Differences | 5 | 0 | 3 | 0 | 0 |
| Costs = Row 1 + Row 2 | 55 | 40 | 28 | 0 | 30 |

METHODS AND SYSTEMS FOR CORRECTING COLOR DISTORTIONS

BACKGROUND OF THE INVENTION

1. Field of the Invention

This invention generally relates to document replication systems and, more particularly, to methods and systems for correcting color distortions.

2. Description of the Related Art

A scanner is a device that captures images printed on a medium such as paper and digitizes the image into a form a computer can use. Most scanners use charge-coupled device (CCD) arrays, which consist of tightly packed rows of light receptors that can detect the printed image in such a way that each element in the image is converted into an electrical charge, the intensity of which is related to a color in the color spectrum. In the scanning of printed images, the three color channels (red, green, and blue) may each suffer color distortions where both the green and blue channels are shifted with respect to the red channel. The color distortions may stem from the use of lesser quality blue CCDs in scanners, as compared to green or red CCDs, because people are less sensitive to blue than green and red. The color distortions may also arise from lens distortions as a result of temperature and humidity changes.

Figure 1A:
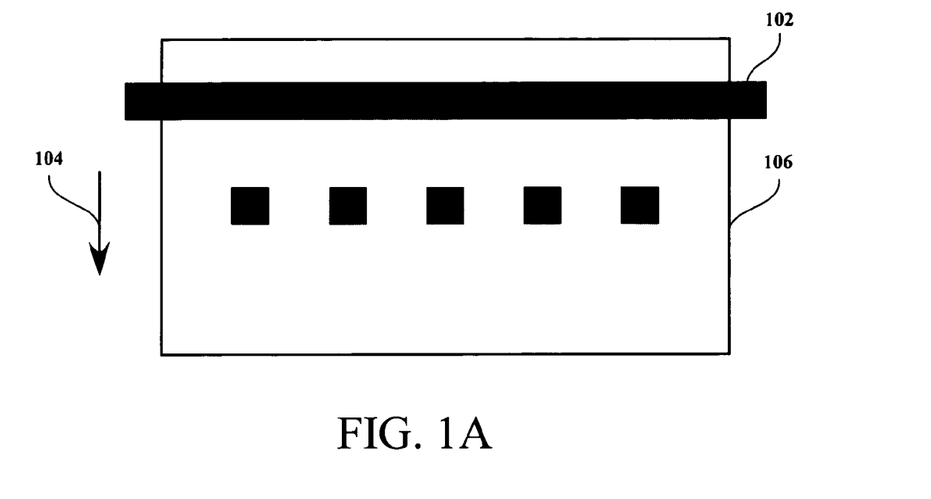
FIG. 1A is a simplified illustration of a scanner scanning a printed image.

FIG. 1A is a simplified illustration of a scanner scanning a printed image. Scanner element 102 scans printed image 106 in the direction indicated by arrow 104. Scanner element 102 includes an array of CCDs that converts each element of printed image 106 to red, green, and blue pixel color values. As shown in FIG. 1A, printed image 106 includes five black squares along a row against a white background. As such, the scanned image is expected to be an exact duplicate of printed image 106 with only black and white colors.

Figure 1B:
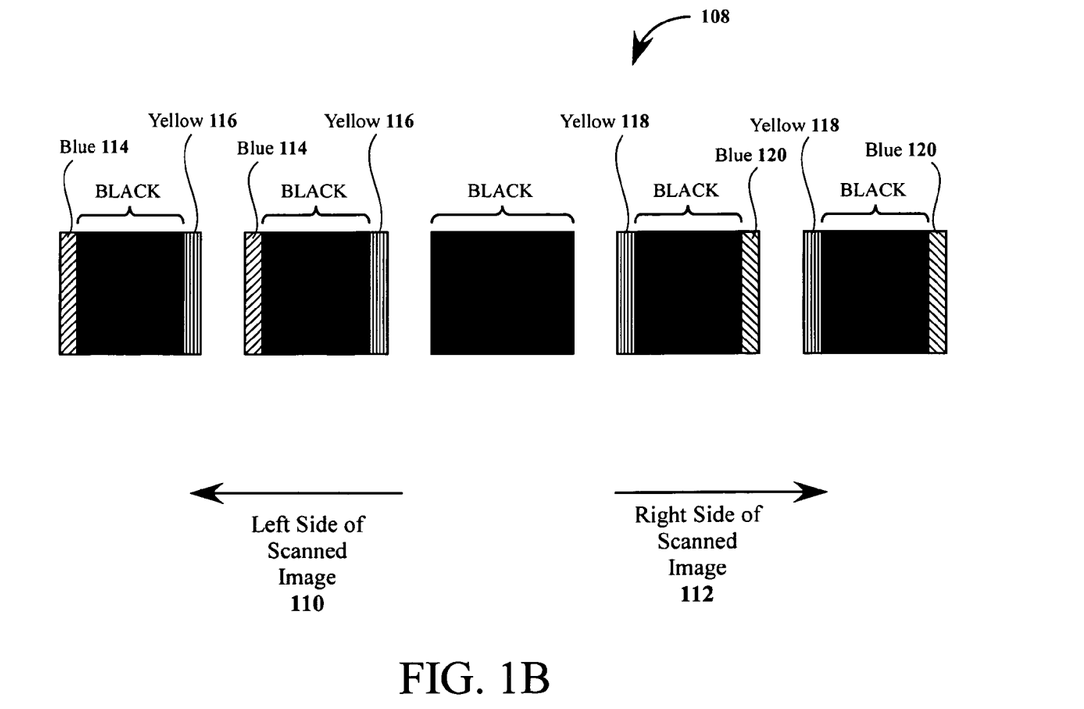
FIG. 1B is an illustration of the printed image of FIG. 1A, as captured by the scanner.

However, as shown in FIG. 1B, actual scanned image 108 includes other colors in addition to black and white. The additional colors are the result of the above described color distortions. In particular, instead of being completely black, the edges of some squares are either slightly yellow or slightly blue. There are no color distortions in the center of scanned image 108 and, as a result, the center square is completely black. Nevertheless, on left side 110 of scanned image 108, the blue channel is shifted noticeably to the right, resulting in squares with blue left edges 114 and yellow right edges 116. In contrast, on right side 112 of scanned image 108, the blue channel is shifted noticeably to the left, resulting in squares with yellow left edges 118 and blue right edges 120.

In view of the foregoing, there is a need to provide methods and systems for correcting the color distortions in scanned images.

SUMMARY OF THE INVENTION

Broadly speaking, the present invention fills these needs by providing methods and systems for correcting color distortions. It should be appreciated that the present invention can be implemented in numerous ways, including as a method, a system, or a device. Several inventive embodiments of the present invention are described below.

In accordance with a first aspect of the present invention, a method for correcting color distortions is provided. In this method, a calibration image is first scanned. Thereafter, a color shift of a first color channel with respect to a second color channel along each pixel column of the calibration image is calculated. The color shift defines a correction for the color distortions and the correction is then applied to subsequent scanned images.

In accordance with a second aspect of the present invention, a method for determining a color shift of a first color channel with respect to a second color channel along a pixel column is provided. In this method, differences in pixel color values between corresponding pixels of a first pixel group in the first color channel and for each incremental shift of a second pixel group in the second color channel are calculated for each pixel row, whereby the first pixel group intersects the pixel column. The differences of each of the pixel rows at each of the incremental shifts are then summed to define costs associated with each of the incremental shifts. Subsequently, a minimum cost is extracted from the costs associated with each of the incremental shifts, and the incremental shift that corresponds to the minimum cost defines the color shift of the first color channel with respect to the second color channel along the pixel column.

In accordance with a third aspect of the present invention, a system for correcting color distortions is provided. The color distortion correction system includes a scanner with an image processing module. The image processing module includes: logic for calculating differences in pixel color values between corresponding pixels of a first pixel group in a first color channel and for each incremental shift of a second pixel group in a second color channel for each pixel row; logic for summing the differences of each of the pixel rows at each of the incremental shifts to define costs associated with each of the incremental shifts; and logic for extracting a minimum cost from the costs associated with each of the incremental shifts. The incremental shift that corresponds to the minimum cost defines the color shift of the first color channel with respect to the second color channel along the pixel column, whereby the color shift defines a correction for the color distortions.

In accordance with a fourth aspect of the present invention, an image processing chip configured to determine a color shift of a first color channel with respect to a second color channel along a pixel column is provided. The image processing chip includes circuitry for selecting a first pixel group along a pixel row in the first color channel; circuitry for selecting a second pixel group along the pixel row in the second color channel; circuitry for calculating differences in pixel color values between corresponding pixels of the first pixel group and the second pixel group for each incremental shift of the second pixel group in the second color channel along the pixel row, whereby the differences define costs associated with each of the incremental shifts; and circuitry for extracting a minimum cost from the costs associated with each of the incremental shifts. The incremental shift that corresponds to the minimum cost defines the color shift of the first color channel with respect to the second color channel along the pixel column.

In accordance with a fifth aspect of the present invention, a computer readable medium having program instructions for determining a color shift of a first color channel with respect to a second color channel along a pixel column is provided. The computer readable medium includes program instructions for calculating differences in pixel color values between corresponding pixels of a first pixel group in the first color channel and for each incremental shift of a second pixel group in the second color channel for each pixel row. The first pixel group intersects the pixel column. In addition, the computer readable medium includes program instructions for summing the differences of each of the pixel rows at each of the incremental shifts. The sum of the differences defines costs associated with each of the incremental shifts. Program instructions for extracting a minimum cost from the costs associated with each of the incremental shifts are also included. The minimum cost defines the color shift of the first color channel with respect to the second color channel along the pixel column.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for methods and systems for correcting color distortions. It will be apparent, however, to one skilled in the art, in light of this disclosure, that the present invention may be practiced without some or all of these specific details. In other instances, well known process operations have not been described in detail in order not to unnecessarily obscure the present invention.

The embodiments described herein provide methods and systems for correcting color distortions. Essentially, a calibration image is used to calculate the color shifts and to calculate the corresponding corrections to subsequent images. As will be explained in more detail below, the color shifts are calculated by examining the differences between different color channels. The correction to the color distortions may then be derived from the calculated color shifts and applied to subsequent scanned images.

Figure 2A:
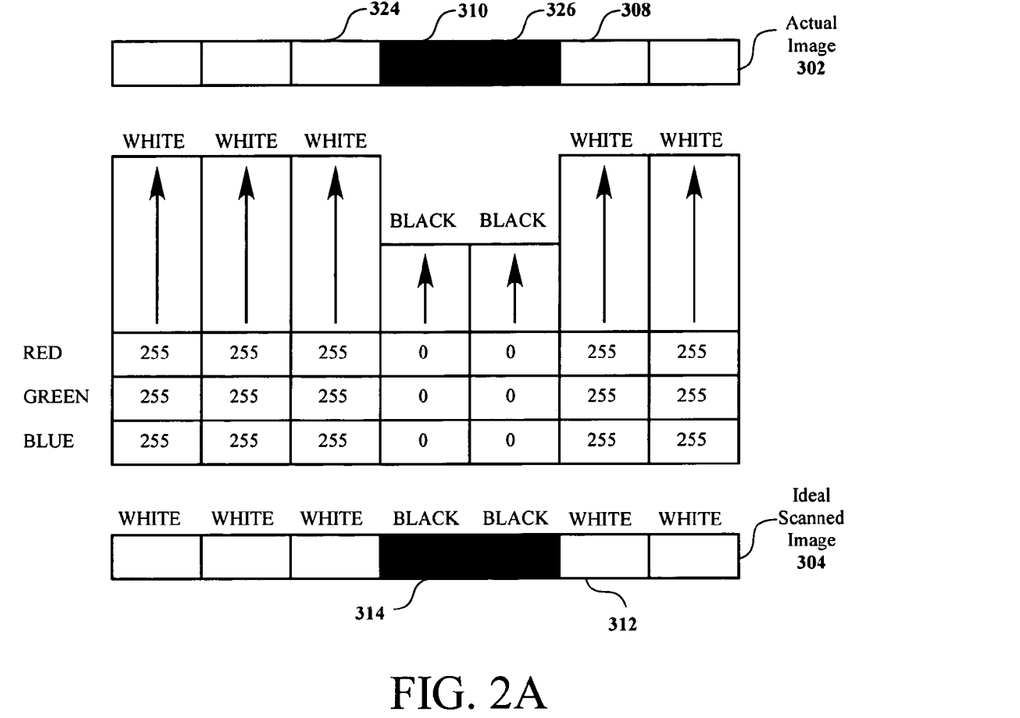
FIG. 2A is a simplified block diagram of an ideal scanned image without color distortions.

FIG. 2A is a simplified block diagram of an ideal scanned image without color distortions. As shown in FIG. 2A, for illustrative purposes, actual image 302 being scanned by a scanner is comprised of two black elements and five white elements along a row. The array of CCDs detect actual image 302 in such a way that each element in the actual image is converted to a pixel with red, green, and blue (RGB) color values. One skilled in the art will appreciate that RGB refers to a system for representing the colors to be used on a computer display. Red, green, and blue can be combined in various proportions to obtain any color in the visible spectrum. Levels of red, green, and blue may be represented by a range of decimal numbers from 0 to 255, where 0 represents a low intensity and 255 represents a high intensity. As a result, a scanner scans actual image 302 and outputs ideal scanned image 304 with corresponding black and white pixels.

In an ideal scan without color shifts, each color channel of a pixel in ideal scanned image 304 directly correlates with each corresponding element of actual image 302. For instance, pixel 312 from ideal scanned image 304 has color values that directly correspond with the white color at element 308 of actual image 302. At element 308, a CCD detects the maximum intensity of a 255 decimal value for each color channel. Thus, the 255 color values result in white pixel 312 of ideal scanned image 304. Likewise, pixel 314 from ideal scanned image 304 has color values that directly correspond with the black color at element 310 of actual image 302. At element 310, another CCD detects the minimum intensity of a 0 decimal value for each color channel. Therefore, the 0 color values result in black pixel 314 of ideal scanned image 304.

Figure 2B:
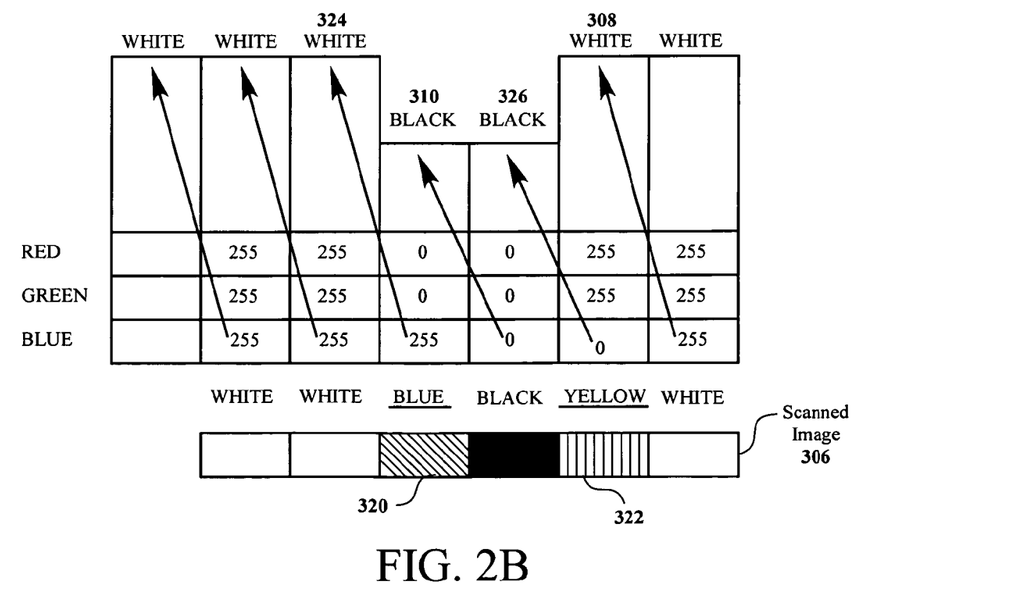
FIG. 2B is a simplified block diagram of a scanned image with color distortions.

In contrast, FIG. 2B is a simplified block diagram of a scanned image with color distortions. In this case, the scanner is also scanning actual image 302 of FIG. 2A. However, instead of only black and white, scanned image 306 also includes blue and yellow. Here, red and green channels directly correlate with each corresponding element of actual image 302. On the other hand, as shown in FIG. 2B, the blue channel is shifted to the right such that the CCDs detect blues not at the corresponding elements of actual image 302, but at the elements to the left of the corresponding elements. For example, pixel 320 from scanned image 306 has red and green color values that directly correspond with black element 310 of actual image 302. Since the blue channel is shifted to the right, the blue color value matches to white element 324 instead of corresponding black element 310. As a result, pixel 320 has a 0 red color value, a 0 green color value, and a 255 blue color value. The lack of red and green results in a blue color for pixel 320. Likewise, pixel 322 from scanned image 306 has red and green color values that directly correspond with white element 308 of actual image 302. In contrast, the blue color value matches to black element 326 instead of corresponding white element 308. Thus, pixel 322 has a 255 red color value, a 255 green color value, and a 0 blue color value. This RGB color combination results in a yellow color for pixel 322.

As seen in FIG. 2A and FIG. 2B, the above described color distortions are localized along the columns of scanned image 306 and do not appear along the rows of the scanned image. The columns are oriented in the same direction that a scanner scans actual image 302. Thus, although FIGS. 1B, 2A, and 2B show the color distortions along a vertical direction, the color distortions may occur along a horizontal direction if the scanner scans actual image 302 in the horizontal direction. For illustrative purposes, FIG. 2B shows the blue channel shifted by one pixel to the right relative to the red and green channels. However, in actuality, the blue channel is more likely to be shifted in fractional increments. Exemplary fractional increments include 0.01 pixels, 0.02, pixels, 0.1 pixels, 0.4 pixels, 0.5 pixels, etc.

Figure 3:
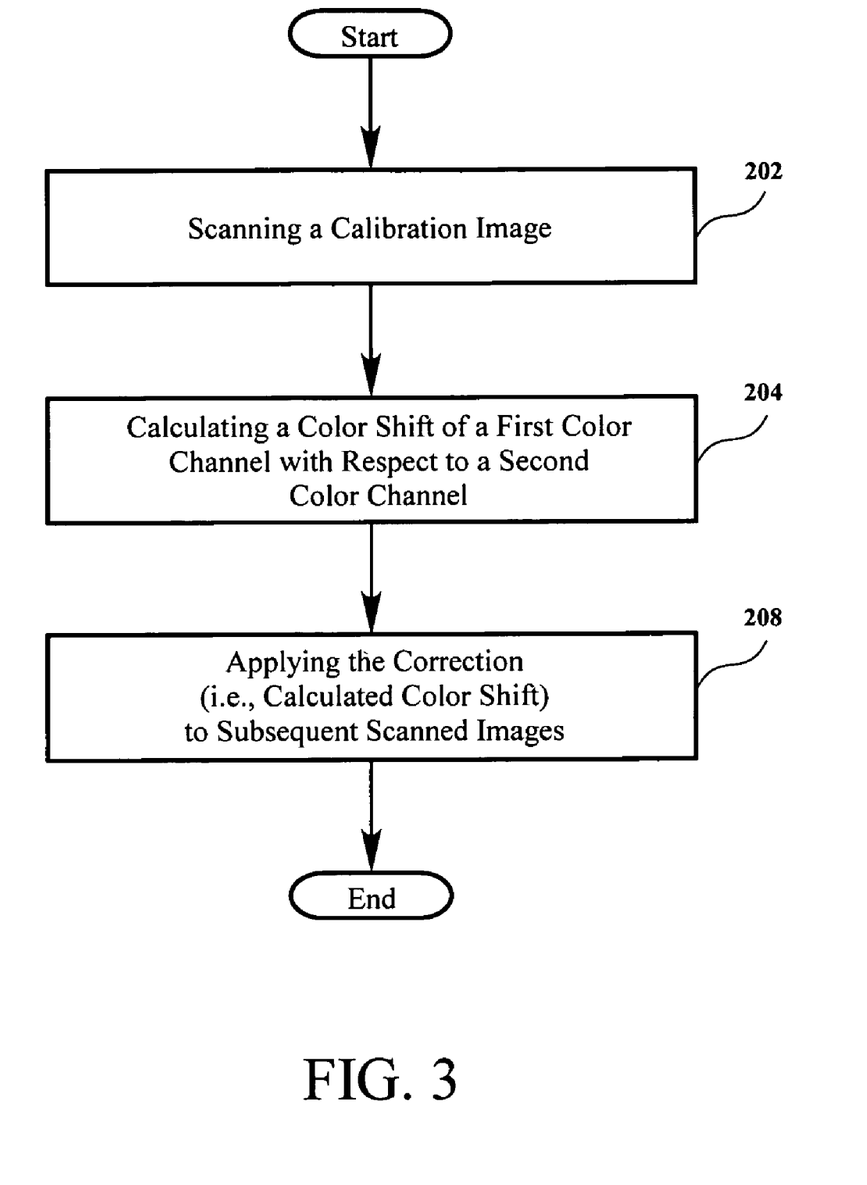
FIG. 3 is a flowchart diagram of a high level overview of a method for correcting color distortions, in accordance with one embodiment of the present invention.

FIG. 3 is a flowchart diagram of a high level overview of a method for correcting color distortions, in accordance with one embodiment of the present invention. As shown in FIG. 3, starting in operation 202, a scanner first needs to scan a calibration image. The calibration image is a printed image normally provided by the manufacturer of the scanner and, as will be explained in more detail below, the calibration image has a specialized pattern particularly suited for determining color shifts along columns of the calibration image. Thereafter, in operation 204, a color shift of a first color channel with respect to a second color channel along each pixel column is calculated using the scanned calibration image. The first and second color channels can be any combination of exclusive color channels. For example, exemplary combinations of color channels include red/blue, red/green, and blue/green. In one embodiment, before the color shifts are calculated, any combination of the color channels may first be de-noised by the application of a conventional noise reduction algorithm. The color shift calculated in operation 204 defines a correction for the color distortions. The correction is stored, and in operation 208, may later be applied to correct subsequent scanned images.

Figure 4A:
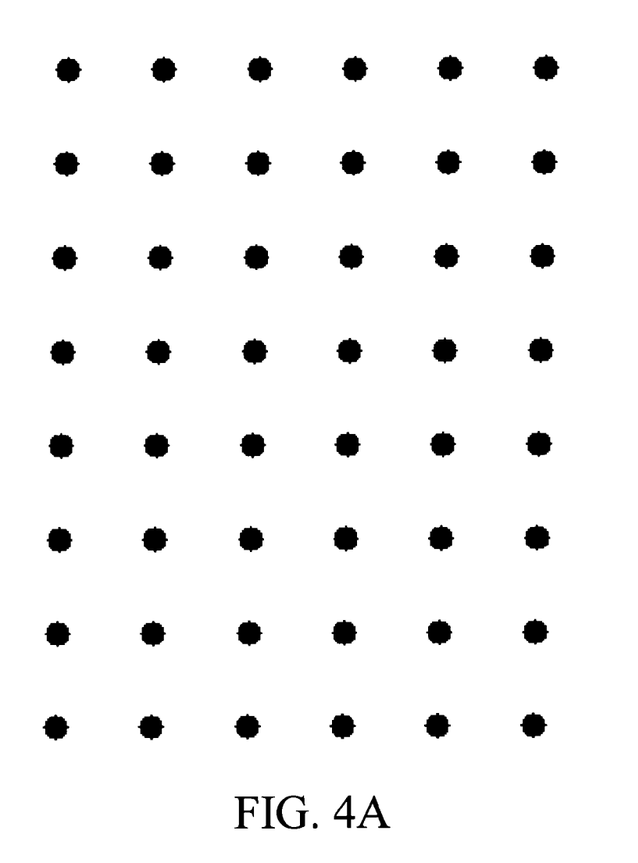
FIGS. 4A and 4B are illustrations of calibration images, in accordance with one embodiment of the present invention.
Figure 4B:
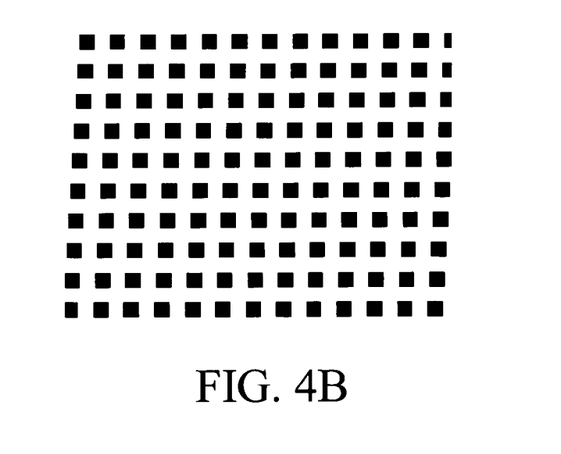

FIGS. 4A and 4B are illustrations of calibration images, in accordance with one embodiment of the present invention. The calibration image may be comprised of various patterns. Exemplary embodiments of patterns include squares, rectangles, circles, line segments, triangles, etc. FIGS. 4A and 4B show repeating circle patterns and square patterns, respectively. However, the patterns may have any suitable mixture of patterns. For example, in one embodiment, calibration image may include a mixture of repeating triangle and circle patterns. Furthermore, the patterns may be in any suitable orientation. For example, in one embodiment, calibration image may include repeating line segments that are skewed. Although the calibration images of FIGS. 4A and 4B are black and white, any suitable colors may be used. Black and white are used in FIGS. 4A and 4B because under ideal conditions, the RGB color channels are virtually identical for back or white and, as such, the use of black and white calibration images can simplify the color shift calculations.

As discussed above, color distortions occur along column edges. As a result, samples of data taken at edges are needed to calculate the color shifts. Specifically, to calculate the color shift at a particular pixel column, the pixel column needs to be in proximity with at least one edge such that samples of data at the edge may be obtained. Therefore, the patterns in the calibration image are arranged such that at least one edge of the pattern is proximate to a column at which the color shift is calculated. In one embodiment, an edge of the pattern is proximate to a pixel column if the pixel column is within half the number of pixels in a pixel group. As will be explained in more detail below, the pixel group is a row of sequential pixels grouped along a row selected within a color channel. In other words, an edge is proximate to a pixel column if the column is within ± (Number of pixels in a pixel group)/2 or, as will be explained in more detail below, if the column is within ± neighborhood M.

As shown in FIGS. 4A and 4B, in one embodiment, each pattern row of the calibration image is slightly shifted with respect to each other such that the patterns are misaligned along the pixel column. The slight shift of the patterns ensures that each pixel column is proximate to at least one edge. The patterns may be spaced at any suitable intervals (e.g., 0.01 pixel, 0.02 pixel, 1 pixel, 10 pixels, etc.), as long as the pixel columns at which the color shifts are to be calculated are proximate with at least one edge. The calibration image may be scanned to calibrate the scanner when first manufactured. Additionally, the calibration image may be scanned periodically throughout the life of the scanner to recalibrate the scanner as changes in temperature, changes in humidity, and wear on the lens all will have an effect on color distortions after the scanner is manufactured. One exemplary period is to calibrate the scanner every 6 months.

It should be appreciated that an embodiment of the present invention may utilize other arbitrary images, instead of the calibration image described above, to determine the color shifts. In this embodiment, a conventional edge detection algorithm, such as Sobel edge detection, Canny edge detection, etc., detects edges on the arbitrary image and the detected edges are used to perform color shift calculations and corrections. As such, in one embodiment, automatic edge detection eliminates calibration using the calibration image as the edges of a scanned image are automatically detected, and the color shift correction is automatically calculated and applied to the scanned image. In effect, the color shift correction is calculated every time an image is scanned.

Figure 5:
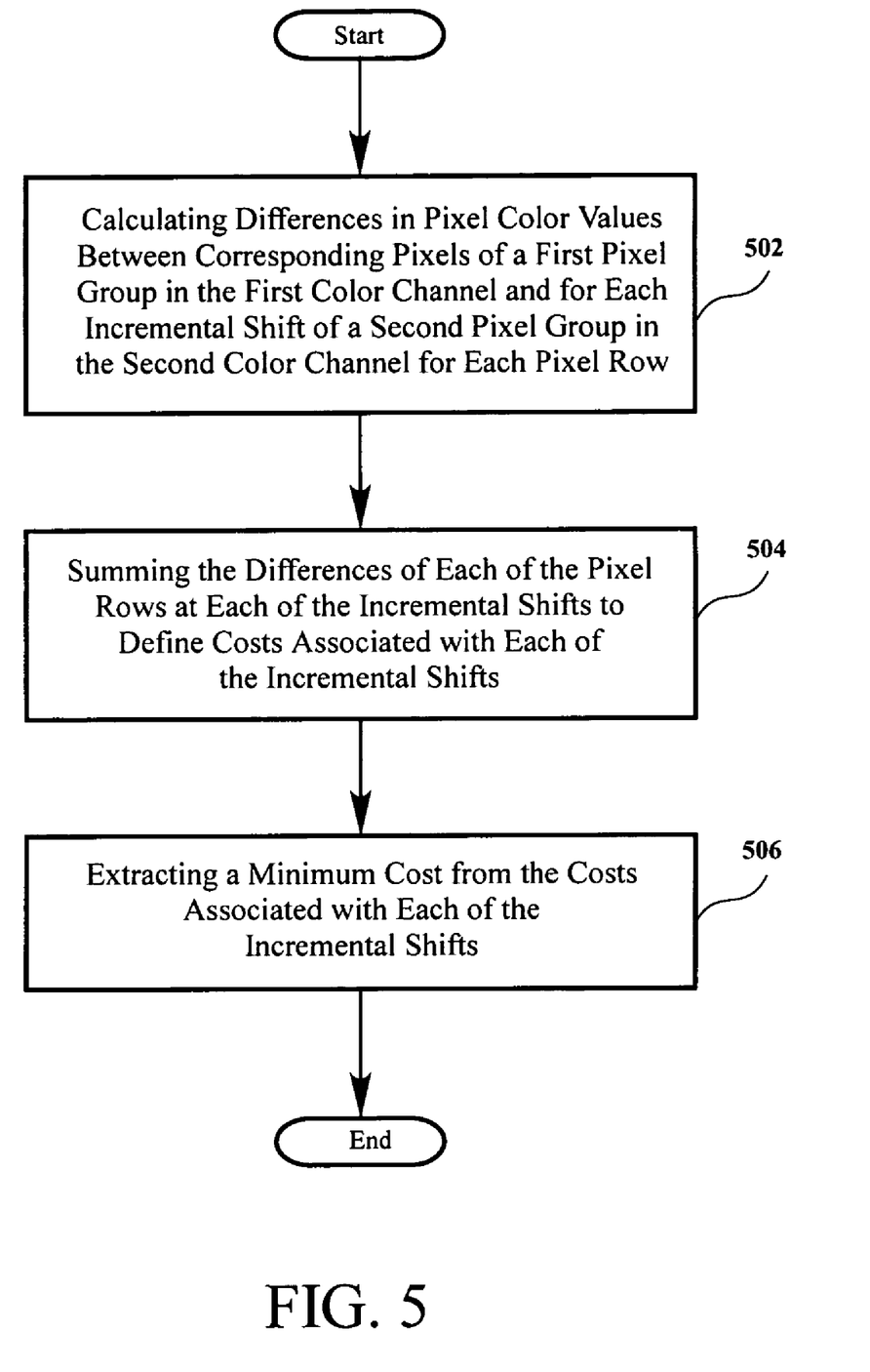
FIG. 5 is a flowchart diagram of a high level overview of a method for determining a color shift of a first color channel with respect to a second color channel along a pixel column, in accordance with one embodiment of the present invention.

FIG. 5 is a flowchart diagram of a high level overview of a method for determining a color shift of a first color channel with respect to a second color channel along a pixel column, in accordance with one embodiment of the present invention. Starting at operation 502, for each row, differences in pixel color values are calculated between corresponding pixels of a first pixel group in the first color channel and for each incremental shift of a second pixel group in the second color channel. In other words, as will be explained in more detail below, a first pixel group along a pixel row in the first color channel is selected and a second pixel group along the same pixel row in the second color channel is selected. In one embodiment, the first pixel group and the second pixel group have the same number of pixels. Thus, the equal number of pixels allows a one-to-one pixel correspondence between the first pixel group and the second pixel group. In another embodiment, as will be explained in more detail below, the first pixel group and the second pixel group do not have the same number of pixels.

Each of the pixels has a color value in one of the RGB color channels, and the differences of the pixel color values are calculated between corresponding pixels of the first pixel group and the second pixel group for each incremental shift of the second pixel group along the pixel row. In effect, the first pixel group remains stationary while the second pixel group shifts along the pixel row. At row j, at each shift, the differences in color values between the first pixel group and the second pixel group are calculated by:

$$\text{Difference}_j = \sum_{n=k-M}^{k+M} |\text{red}(n - S_b(n)) - \text{blue}(n)|^2 \quad (1)$$

where at each shift $S_b(n)$, for each pixel (n) within a pixel group having $2M+1$ number of pixels, the pixel color values of corresponding pixels in the blue and red channels are subtracted to define the mean squared errors. The neighborhood M represents the pixels that are to the left and right of pixel k. As will be explained in more detail below, the k represents the pixel that intersects the pixel column. Thus, the number of pixels in neighborhood M is half the number of pixels in the second pixel group.

It should be appreciated that instead of calculating the squared difference, any suitable differences may be used. For example, in one embodiment, the difference may simply be the absolute difference as defined by |red(n-$S_b$(n))-blue(n)|. Therefore, the mean squared errors are summed to define a difference at each shift. It should be appreciated that the differences may be calculated for any combination of distinct color channels. For example, in another embodiment, the differences for a shift of a second pixel group in the red channel relative to a first pixel group in the green color channel are calculated by:

$$\text{Difference}_j = \sum_{n=k-M}^{k+M} |\text{red}(n - S_g(n)) - \text{green}(n)|^2. \quad (2)$$

As shown in FIG. 5, in operation 504, the differences of each of the pixel rows at each of the incremental shifts are then summed to define costs associated with each of the incremental shifts. The costs are calculated as follows:

$$\text{Cost}(i) = \sum_{j=1}^{\text{Rows}} \text{Difference}_j(i) \quad (3)$$

where Rows is the total number of pixel rows in the calibration image. Subsequently, at operation 506, the minimum cost is extracted from the costs associated with each of the incremental shifts. The color shift is the incremental shift that corresponds to the minimum cost. In mathematical terms, Color_Shift=arg min Cost($i$). (4)

The calculated color shift is along one pixel column. To correct for color distortions for an entire image, the calculations discussed above may be repeated for every pixel column at which the color shift is to be corrected.

Figure 6A:
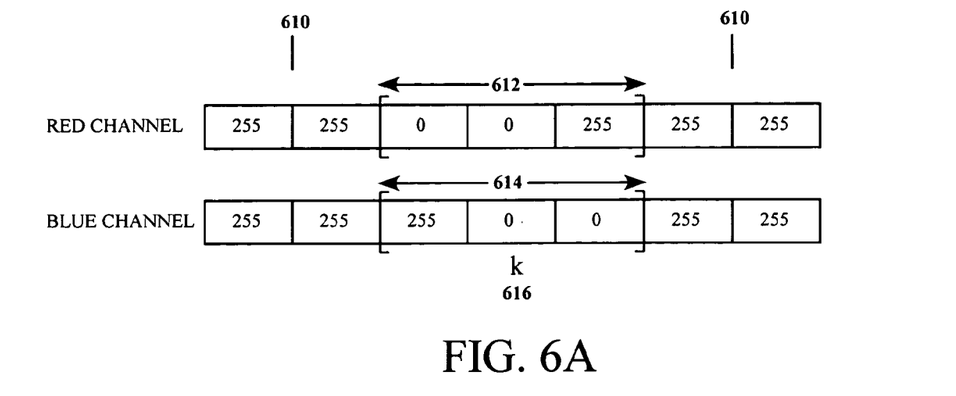
FIGS. 6A, 6B, and 6C are simplified block diagrams illustrating the shifting of the second pixel group in the red channel relative to the first pixel group in the blue channel, in accordance with one embodiment of the present invention.
Figure 6B:
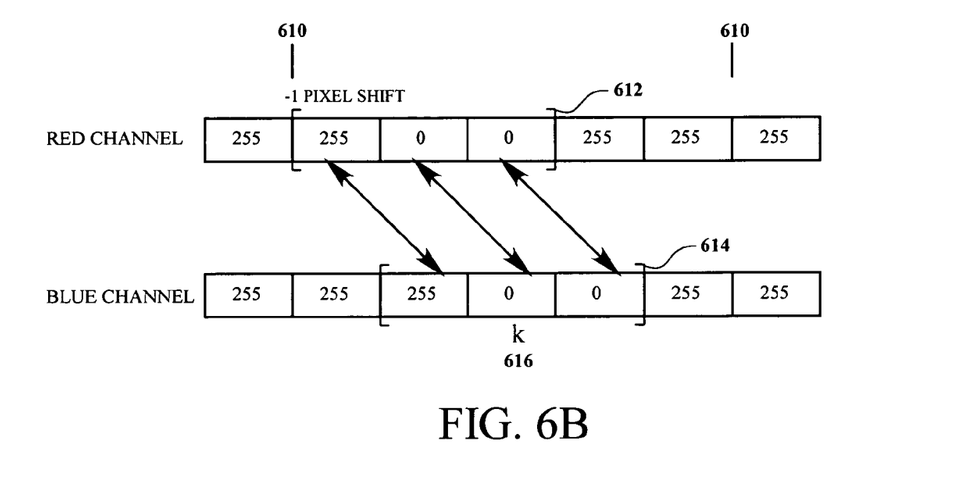
Figure 6C:
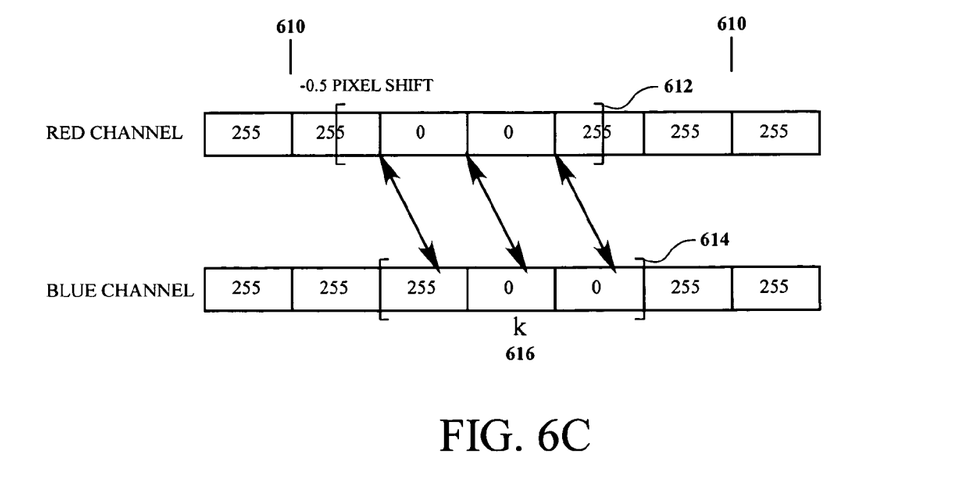

FIGS. 6A, 6B, and 6C are simplified block diagrams illustrating the shifting of the second pixel group in the red channel relative to the first pixel group in the blue channel, in accordance with one embodiment of the present invention. As discussed above, differences in pixel color values are calculated between corresponding pixels of a first pixel group in the first color channel and for each incremental shift of a second pixel group in the second color channel. FIGS. 6A, 6B, and 6C show a red channel and a blue channel from a row of pixels. To calculate the differences in pixel color values, first pixel group 614 along a pixel row in the blue channel is selected and second pixel group 612 along the same pixel row in the red channel is additionally selected. The pixel group is a row of sequential pixels grouped along a row. As shown in FIG. 6A, each pixel group 612 and 614 is comprised of 3 pixels. However, pixel groups 612 and 614 may include any number of suitable pixels. For example, in one embodiment, for a 300 dots per inch (dpi) scanner, a pixel group includes 200 sequential pixels along a pixel row. In another embodiment, for a 600 dpi scanner, a pixel group includes 400 pixels along a pixel row.

Second pixel group 612 may be located anywhere along the pixel row. However, first pixel group 614 along the same pixel row includes a pixel k 616 located on the pixel column at which the color shift is to be calculated. In effect, first pixel group 614 intersects the pixel column and, as a result, the first pixel group is in the vicinity of the pixel column. Furthermore, in one embodiment, first pixel group 614 and second pixel group 612 have an identical number of pixels. Thus, the equal number of pixels allows a one-to-one pixel correspondence between first pixel group 614 and second pixel group 612.

The shifting occurs between two predefined shift boundaries 610. As shown in FIG. 6A, predefined shift boundaries 610 are ±1 pixel. However, predefined shift boundaries 610 may include any suitable boundary (e.g. ±0.5 pixel, ±1 pixel, ±2 pixels, etc.) and need not be limited to a whole number. In one embodiment, the predefined shift boundaries are set to a maximum color shift error as specified by the scanner or CCD manufacturer. For example, the maximum shift error for a 300 dpi scanner is usually less than or equal to 1 pixel. The maximum shift error for a 600 dpi scanner is usually less than or equal to 2 pixels. Thus, these manufacturer's recommended shift errors may be used to determine the corresponding shift values.

As shown in FIG. 6B, second pixel group 612 is shifted 1 pixel to the left relative to first pixel group 614. According to the above described differences equations (1) and (2), to calculate the differences in pixel color values between corresponding pixels of first pixel group 614 and shifted second pixel group 612, the pixel color values of the first pixel group is first subtracted from the corresponding pixel color values of the second pixel group. In FIG. 6B, first pixel group 614 has pixel color values [255, 0, 0] in the blue channel. At the −1 pixel shift, second pixel group 612 also has pixel color values [255, 0, 0] in the red channel. As a result, subtracting [255, 0, 0] from [255, 0, 0] results in [0, 0, 0]. The values [0, 0, 0] are then summed such that the difference at −1 pixel shift is 0+0+0=0. The exemplary difference calculation is repeated for each pixel shift within predefined shift boundaries 610.

The shifts may be in any suitable increments. As discussed above, the color channels are more likely to shift in fractional increments. Thus, the shifts may also be in fractional increments. In one embodiment, the shift is set to 0.02 pixels for a 300 dpi scanner. In another embodiment, the shift is set to 0.01 pixels for a 600 dpi scanner. If the shift is fractional, then the pixel color values are interpolated at each of the fractional increments. As is known to those skilled in the art, there are various interpolation methods (e.g., linear interpolation, multivariate polynomial interpolation, Lagrange interpolation, etc.). For example, as shown in FIG. 6C, for a −½ pixel shift of second pixel group 612 relative to first pixel group 614, a pixel color value between 255 and 0 of second pixel group 612 needs to be calculated. The application of a linear interpolation estimates that the pixel color value is the sum of half the first pixel value and half the second pixel value (i.e., ½(255)+½(0)=127.5).

Figure 7:
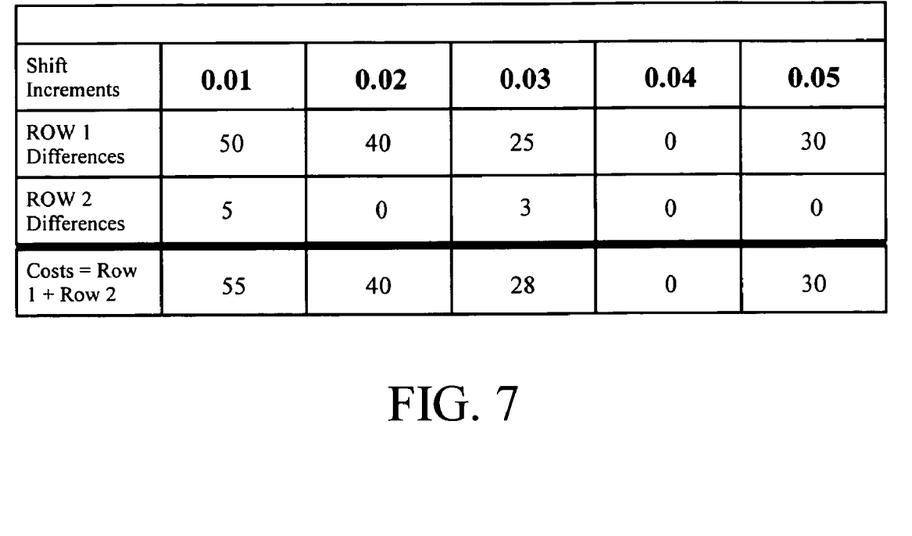
FIG. 7 is a table of exemplary data from two pixel rows to illustrate the calculation of the color shift along a pixel column, in accordance with one embodiment of the present invention.

FIG. 7 is a table of exemplary data from two pixel rows to illustrate the calculation of the color shift along a pixel column, in accordance with one embodiment of the present invention. After the differences in pixel color values are calculated, the costs associated with each of the incremental shifts are determined. The table of FIG. 7 includes exemplary data to illustrate the calculation of the costs and the color shift along a pixel column. Specifically, the table of FIG. 7 includes exemplary calculated differences for each incremental shift along pixel Row 1 and pixel Row 2. As discussed above, $$\text{Cost}(i) = \sum_{j=1}^{\text{Rows}} \text{Difference}_j(i).$$

Thus, at 0.01 pixel shift,

Cost(0.01 pixel shift)=difference$_{ROW1}$(50)+difference$_{ROW2}$(5)=55.

In other words, the cost at 0.01 pixel shift is the sum of Row 1 difference at shift 0.01 and Row 2 difference at shift 0.01. In this way, as shown in the table of FIG. 7, the costs associated with each incremental shift are calculated as [55, 40, 28, 0, 30].

The calculated differences described above are differences between corresponding pixels of the first pixel group and the second pixel group with the same number of pixels within the groups. However, the first pixel group and the second pixel group may include different number of pixels, in accordance with another embodiment of the present invention. For instance, the pixels of the first pixel group in the blue color channel could correspond to a smaller number of pixels (i.e., range of pixels) of the second pixel group in the red color channel. In this embodiment, when calculating the differences in accordance with equations (1) and (2), the correspondence between pixels can be scaled to map accordingly. For example, the arrows of FIGS. 6B and 6C represent the correspondence between pixels in different color channels. Since both the first pixel group in the blue channel and the second pixel group in the red channel have the same number of pixels, the spacing of the arrows are identical as there's a one-to-one correspondence between the pixels. As such, the shifts between the pixels are constant. However, if the number of pixels is different, then the arrows will be compressed or expanded to reflect that the shifts between the pixels are not constant. Instead, more complicated shifts may be incorporated, such as locally linear or locally polynomial shifts.

Returning to FIG. 7, as discussed above, the minimum cost is then extracted from the costs associated with each of the incremental shifts. The incremental shift that corresponds to the minimum cost defines the color shift of the first color channel with respect to the second color channel along the pixel column. Here, the minimum cost extracted from [55, 40, 28, 0, 30] is 0. This minimum 0 cost corresponds with a shift of 0.04 pixels. Therefore, along a particular pixel column, the color shift is calculated to be 0.04 pixels. The color shift is then used to correct the color distortions. In effect, the color shift defines the correction for the color distortions.

Figure 8:
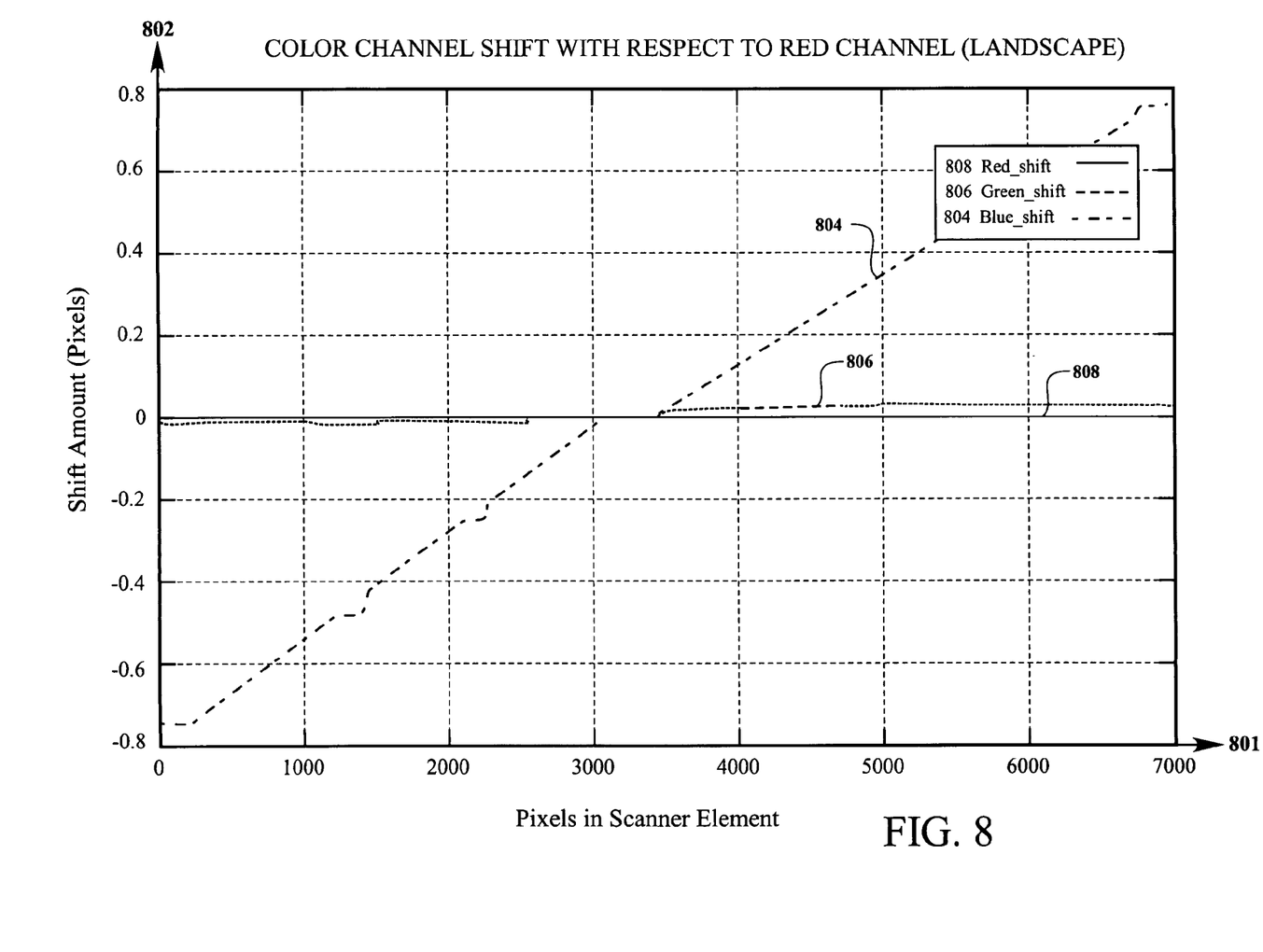
FIG. 8 is a graph of the calculated color shifts for each pixel column of an image, in accordance with one embodiment of the invention.

FIG. 8 is a graph of the calculated color shifts (i.e., corrections for the color distortions) for each pixel column of an image, in accordance with one embodiment of the invention. After the color shifts of the pixel columns are calculated, for illustrative purposes, the color shifts may be plotted on a graph. As shown in FIG. 8, the graph includes horizontal axis 801 and vertical axis 802. Horizontal axis 801 represents the pixel columns of the image and vertical axis 802 represents the color shift (in pixels). The graph plots the color shifts of both the blue and green channels with respect to the red channel. Red shift line 808 represents the red shift, green shift line 806 represents the green shift with respect to the red channel, and blue shift line 804 represents the blue shift with respect to the red channel.

As evidenced by the flat red shift line 808, there are no red shifts because the red channel is used as a reference. As expected, since the scanner manufacturers typically use lesser quality components associated with blue color, blue shift line 804 shows that blue channel has the largest shifts, up to ±0.8 pixels. Furthermore, in agreement with actual observation of scanned images, the calculated graph shows that the left and right sides of image have opposite color shifts, while the center of image has no color shifts.

Figure 9A:
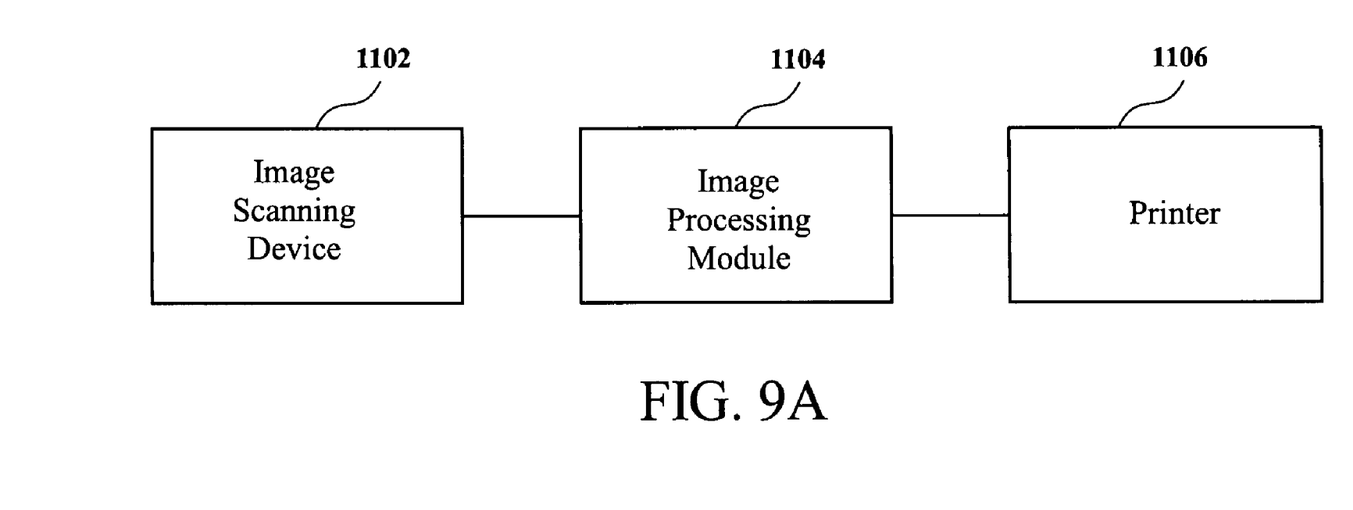
FIGS. 9A and 9B are simplified block diagrams of systems for correcting color distortions, in accordance with one embodiment of the present invention.

FIG. 9A is a simplified block diagram of a system for correcting color distortions, in accordance with one embodiment of the present invention. The system includes image scanning device 1102 (i.e., a scanner), image processing module 1104, and printer 1106. In another embodiment, image processing module 1104 may be designed to work jointly with an image enhancement module (not shown) located between image processing module 1104 and printer 1106 that further segments and enhances compound documents after image processing module 1104 processes the image. For more information on segmenting compound documents and image enhancement, reference may be made to U.S. patent application Ser. No. 10/625,107, filed on Jul. 23, 2003, and entitled "Method and Apparatus for Segmentation of Compound Documents," the disclosure of which is incorporated by reference herein in its entirety for all purposes.

In one embodiment, the system is a photocopier that includes image scanning device 1102, image processing module 1104, and printer 1106. In another embodiment, the system includes image scanning device 1102 and image processing module 1104. Image processing module 1104 may additionally be included in image scanning device 1102 or printer 1106, in accordance with one embodiment of the present invention. Image scanning device 1102 includes any suitable type of device that captures images in color or grayscale, as the embodiments of this present invention may also be applied to grayscale images. Printer 1106 includes any suitable type of device that accepts text and graphic output from a computer or image scanning device 1102, in color or grayscale, and transfers the information to paper.

In one embodiment, the functionalities for correcting color distortions are incorporated into image processing module 1104. Thus, the image processing module 1104 processes and corrects the color distortions of a scanned image as received from image scanning device 1102 and outputs the corrected image to printer 1106 for print. Image processing module 1104 includes the logic described above with reference to FIGS. 3 and 5. In one exemplary embodiment, image processing module 1104 includes a logic module for calculating differences in pixel color values between corresponding pixels of a first pixel group in a first color channel and for each incremental shift of a second pixel group in a second color channel for each pixel row. Logic modules for summing the differences of each of the pixel rows at each of the incremental shifts and for extracting a minimum cost from costs associated with each of the incremental shifts are also included. It should be appreciated that the logic modules referenced above may include hardware, software, or some combination of software and hardware.

Figure 9B:
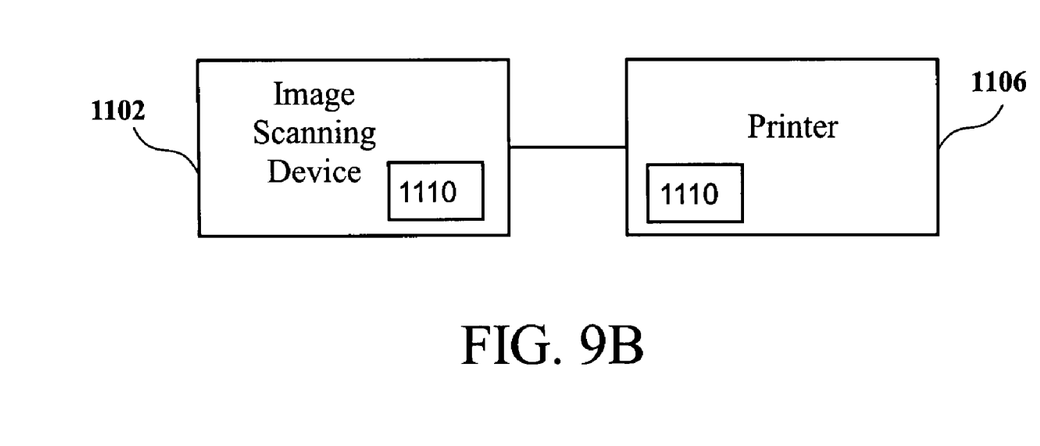

As shown in FIG. 9B, image scanning device 1102 or printer 1106 may also contain image processing chip 1110 configured to determine a color shift of a first color channel with respect to a second color channel along a pixel column, in accordance with one embodiment of the present invention. One skilled in the art will appreciated that the functionality described for determining a color shift with reference to FIG. 5 may be incorporated into a semiconductor chip or integrated circuit, such as image processing chip 1110. For example, in one embodiment, image processing chip 1110 includes: circuitry for selecting a first pixel group along a pixel row in the first color channel; circuitry for selecting a second pixel group along the pixel row in the second color channel; circuitry for calculating differences in pixel color values between corresponding pixels of the first pixel group and the second pixel group for each incremental shift of the second pixel group along the pixel row; and circuitry for extracting a minimum cost from the costs associated with each of the incremental shifts.

It will be apparent to one skilled in the art that the functionality described herein may be synthesized into firmware through a suitable hardware description language (HDL). For example, the HDL (e.g., VERILOG) may be employed to synthesize the firmware and the layout of the logic gates for providing the necessary functionality described herein, as referenced to FIGS. 3 and 5, to provide a hardware implementation of the color distortion correction techniques and associated functionalities. Thus, the embodiments described herein may be captured in any suitable form or format that accomplishes the functionality described herein and is not limited to a particular form or format. For example, in one embodiment, image processing module 1104 or image scanning device 1102 may contain the functionality to correct for color distortions but not the functionality to determine the color shifts along pixel columns. In this embodiment, the color shifts may be calculated separately and then provided to image processing module 1104 or image scanning device 1102.

In summary, the above-described invention provides methods and systems for correcting color distortions in scanned images. Essentially, to determine the color shifts, the differences in pixel color values of two different color channels are examined. When compared to a scanned image without color shift correction, graphic edges of corrected images are sharper and the colors more closely match the original printed image.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The above-described invention may be practiced with other computer system configurations including hand-held devices, microprocessor systems, microprocessor-based or programmable consumer electronics, minicomputers, main-frame computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for correcting color distortions, comprising method operations of:

scanning a calibration image comprised of a plurality of rows of patterns, wherein each row of patterns is shifted by a fraction of a pixel relative another row;

calculating a color shift of a first color channel with respect to a second color channel along each pixel column of the calibration image, the color shift defining a correction for the color distortions includes:

(a) selecting a first pixel group along a pixel row in the first color channel, the first pixel group including a pixel in a pixel column (b) calculating an interpolated color value for each pixel in the first group of pixels forming an interpolated pixel group. wherein the interpolated color value is representative of color values that are shifted by a fraction of a pixel relative to the pixel position;

(c) selecting a second pixel group along the pixel row in the second color channel, the second pixel group corresponding to the pixels in the first group;

(d) calculating differences in pixel color values between the interpolated pixel group and color values of the second pixel group;

(e) repeating steps (a)-(d) among a plurality of pixel rows, each pixel group includes a pixel in the pixel column, wherein the color values in each row are shifted by the same fraction;

(f) calculating a cost of the factional shift based on the differences calculated for the plurality of rows;

(g) repeating steps (a)-(f) with a plurality of fractional shifts, to extract a fractional shift with a minimum cost; and (g) repeating steps (a)-(g) with a plurality of pixel columns; and applying the correction to subsequent scanned images.

2. The method of claim 1, further comprising:
applying noise reduction to the first and second color channels.

3. The method of claim 1, further comprising:
repeating each of the method operations for each of the pixel columns.

4. The method of claim 1, wherein the calibration image is comprised of patterns that are aligned such that the pixel column is proximate to at least one pattern edge.

5. The method of claim 4, wherein the pixel column is proximate to the at least one pattern edge if the pixel column is within a neighborhood of the at least one pattern edge, the neighborhood being defined as half a number of pixels in the first pixel group.

6. The method of claim 4, wherein each of the patterns is selected from the group consisting of a square, a rectangle, a circle, a line segment, and a triangle.

7. The method of claim 4, wherein each of the patterns is misaligned along the pixel column.

8. The method of claim 4, wherein each pattern row is shifted with respect to each other.

9. The method of claim 1, wherein the calibration image is comprised of black and white patterns.

10. An image processing chip configured to determine a color shift of a first color channel with respect to a second color channel along a pixel column, comprising,
circuitry for performing the method recited in claim 1.

11. The image processing chip of 10, wherein the image processing chip is incorporated in an image scanning device or a printer.

12. A computer readable medium encoded with instructions for a computer to perform the method of claim 1.

* * * * *